G. W. Lamb,

Sleigh Bell.

No. 94,010.                    Patented Aug 24, 1869.

Witnesses:
A. W. Almquist
Hinchman

Inventor:
Geo. W. Lamb
per Munn & Co
Attorneys.

United States Patent Office.

GEORGE W. LAMB, OF COBALT, CONNECTICUT.

Letters Patent No. 94,010, dated August 24, 1869.

IMPROVEMENT IN SLEIGH-BELLS.

The Schedule referred to in these Letters Patent and making part of the same.

*To all whom it may concern:*

Be it known that I, GEORGE W. LAMB, of Cobalt, in the county of Middlesex, and State of Connecticut, have invented a new and useful Improvement in Sleigh-Bells; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved mode of attaching sleigh-bells to their straps, so that they may be conveniently attached and detached, and so that they cannot turn in said strap, and will be held securely; and It consists in forming the base of the bell with a collar, flattened shank, screw, and nut, as hereinafter more fully described.

A represents the body of the bell, about the construction of which there is nothing new.

Upon the base of the bell A is formed a collar, B, upon which the strap C rests, and against which it is clamped by the nut.

Figure 1:
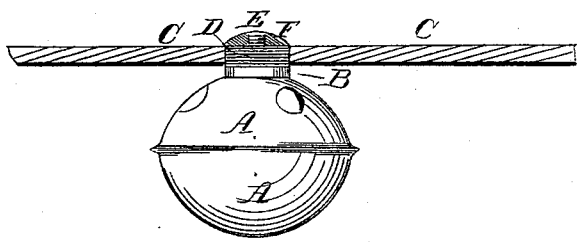
Figure 1 is a side view of my improved bell, with a longitudinal section of a portion of the strap to which it is attached, taken through the line $x\ x$, fig. 2.
Figure 2:
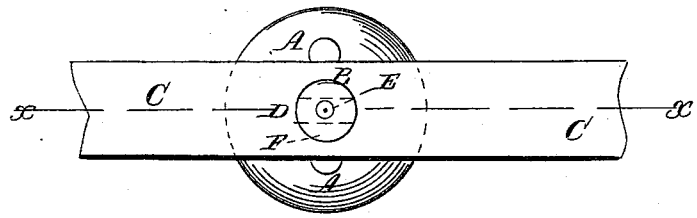
Figure 2 is a top view of the same.

D is the shank, which is made narrow in one direction and broad in the other direction, as shown in fig. 1, and in dotted lines in fig. 2.

The shank D, in its longest direction, is designed to extend entirely or nearly across the collar B, and should be of a height equal or nearly equal to the thickness of the strap C, to which it is to be attached.

Upon the centre of the upper edge of the shank D, is formed a screw or projection, E, having a screw-thread cut upon it, fitting into the screw-thread of the nut F, which is screwed upon it, as shown in figs. 1 and 2, clamping the strap between the said nut and the collar B.

The outer side of the nut F should be rounded off, as shown in the drawings, leaving its outer surface entirely smooth, so that the inner strap usually connected with the main strap C may be dispensed with, if desired.

By this construction the bell will be securely connected with the strap, and in such a way that it cannot turn in said strap.

Having thus described my invention,

I claim as new, and desire to secure by Letters Patent—

The collar B, long and narrow shank D, screw E, and nut F, in combination with the body A of the bell, substantially as herein shown and described, for the purpose of securely connecting the said bell with the strap upon which it is strung

GEO. W. LAMB.

Witnesses:
ELIZABETH BLOOMFIELD,
MARIA ACKLEY.